Nov. 22, 1960     I. M. DAVIDSON ET AL     2,961,192
JET PROPELLED AIRCRAFT

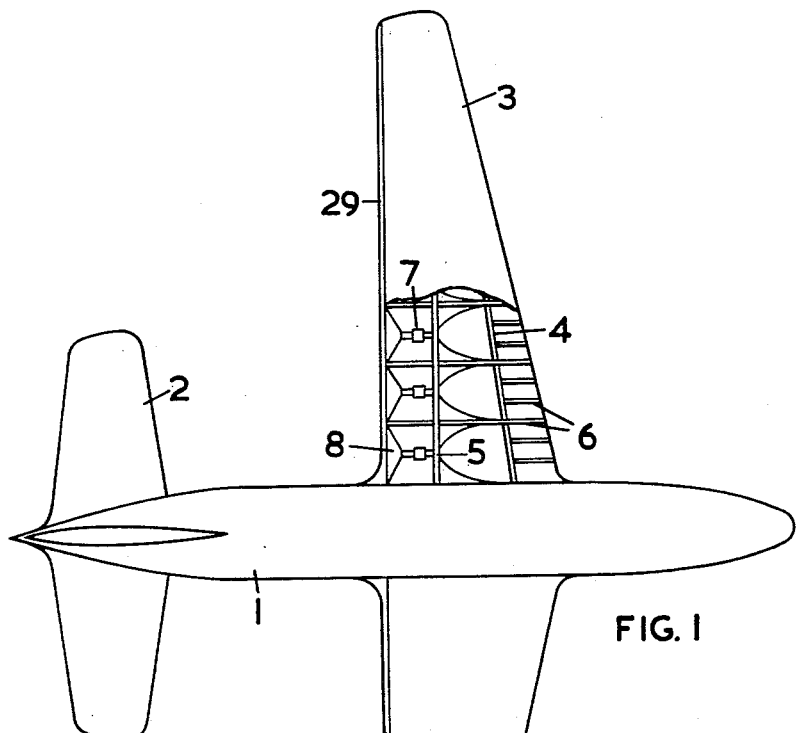
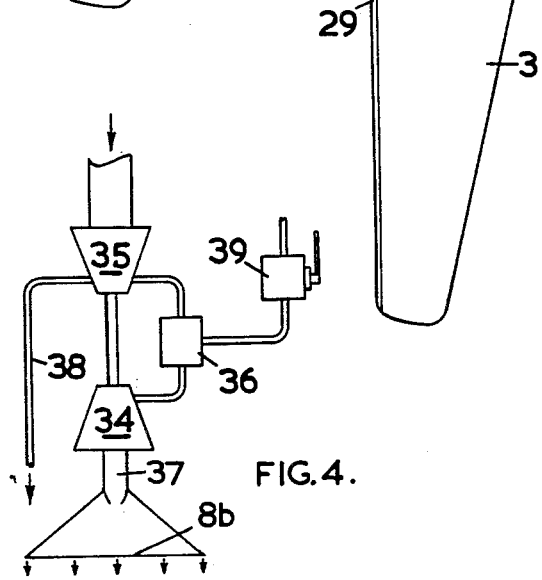

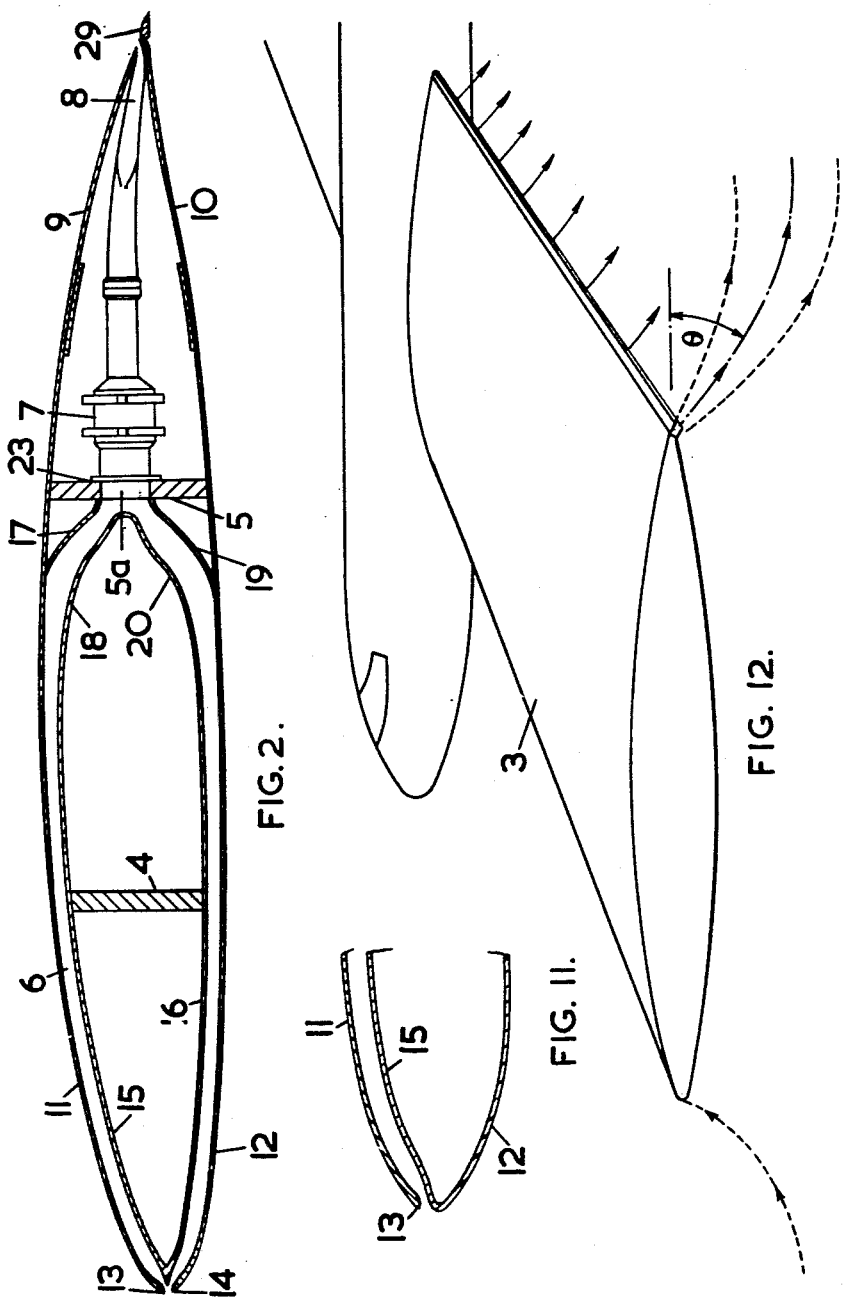

Original Filed April 7, 1954     5 Sheets-Sheet 5

United States Patent Office 2,961,192
Patented Nov. 22, 1960

2,961,192

JET PROPELLED AIRCRAFT

Ivor Macaulay Davidson and Brian Stapleton Stratford, Farnborough, England, assignors to Power Jets (Research & Development) Limited, London, England, a British company Continuation of application Ser. No. 421,620, Apr. 7, 1954. This application Oct. 27, 1955, Ser. No. 543,212

Claims priority, application Great Britain Apr. 8, 1953

16 Claims. (Cl. 244—15)

This invention relates to a jet propelled wing of an aircraft, i.e. a lifting element propelled by the reaction of a propulsive jet stream of gas leaving the element.

The present application is a continuation of application Serial No. 421,620, filed April 7, 1954, now abandoned.

According to the invention the jet stream is emitted from a long shallow jet nozzle extending spanwise along a rear portion of the wing so that the jet leaves the trailing edge of the wing in the form of a long thin sheet.

According to further features, the jet nozzle extends along a major part of the wing span, its extent and form being such as to modify the pressure distribution over the wing and hence increase the aerodynamic lift on the wing as hereinafter set forth. In a fixed-wing aircraft (as distinct from a rotary wing) with a pair of wings the nozzle extends as nearly as possible from wing-tip to wing-tip except where perhaps interrupted by a fuselage etc. In the said pair of fixed wings, means are provided for deflecting at least parts of the jet in regions on opposite sides of the fore and aft centre line of the aircraft downwardly together, upwardly together, or in opposite senses, to serve as flying control surfaces instead of elevators, flaps, ailerons, etc.

The nozzle may be in the trailing edge of the wing. In a very important form of the invention however the jet is discharged over a hinged rear wing-flap, which may furthermore be much shorter chordwise in relation to the wing chord than wing-flaps hitherto used, and the nozzle may extend along the rear end of the fixed part of the wing at the junction of the latter with the wing-flap or the nozzle may extend along the top surface of the wing, forward of this junction. As this wing-flap moves up and down the jet is deflected to follow the line of the top surface of the flap.

Advantages of the invention are that the action of the propulsive jet can considerably increase the aerodynamic lift; the noise of the issuing jet is greatly reduced as a consequence of the high ratio of periphery to area of the jet nozzle and controls may be simplified by using the jet for control purposes.

Of the accompanying drawings:

Figure 1 is a general view of an aircraft incorporating the invention,

Figure 2 is a cross section of the wing of Fig. 1,

Figure 4 is a view of an engine arrangement,

Figure 11 is a view of a modified inlet, and Figure 12 is a diagram illustrating the operation.

Figure 3:
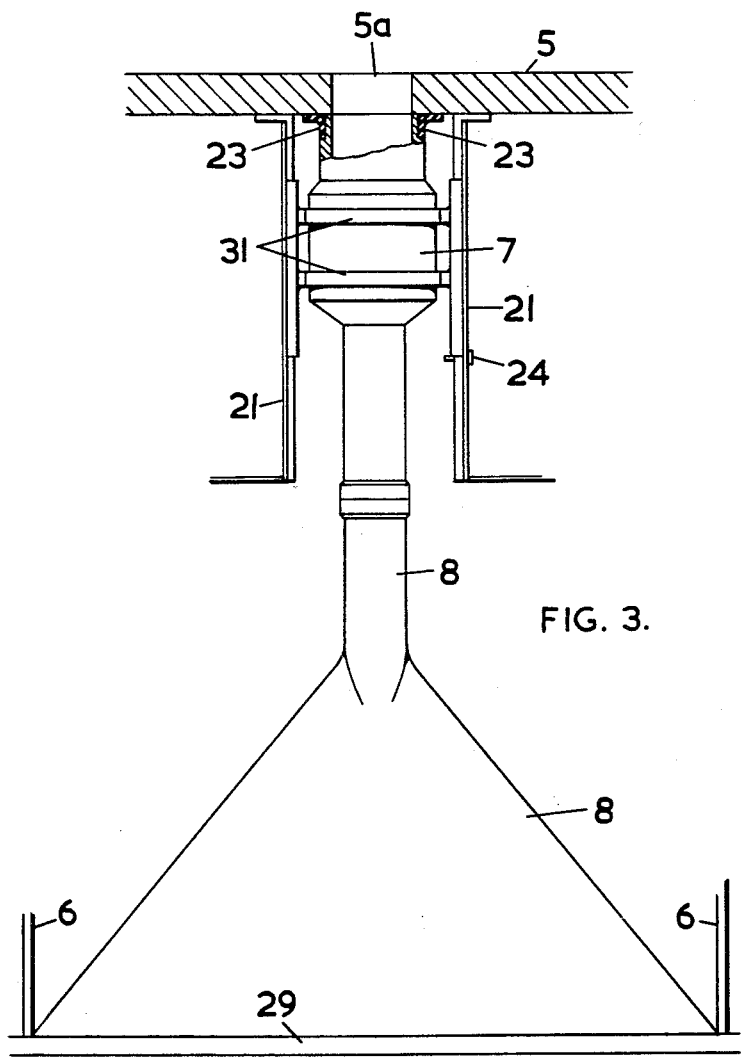
Figure 3 is an enlarged detail in plan, showing the engine mounting.

In Figure 1 the aircraft comprises a fuselage 1, a tailplane 2, and wings 3 of which the structure includes a front main spar 4, a rear main spar 5 and such other spanwise and chordwise structural elements as usually make up a wing. Referring also to Figs. 2 and 3, there is a number of jet engines 7 housed inside the wing immediately behind the rear main spar 5, for emitting jets through a series of contiguous flattened nozzles 8 which combine to form a long shallow jet nozzle along the trailing edge of the wing. As shown in Fig. 1 the nozzle extends as nearly as possible from wing-tip to wing-tip except where interrupted by the fuselage 1. Fairings 9 and 10 over and under the engines, at least one being detachable, constitute the trailing surfaces of the wings. The engines 7 are pushed into the channel exposed when either of these fairings is removed, each engine being separately attached, as described hereinafter, so that each can be readily detached and independently withdrawn for inspection or repair and readily replaced.

The term "engine" is used to mean a complete jet-propulsion power unit, possibly with auxiliaries for one or more engines, and a jet pipe terminating in a jet nozzle; for example the engine may be a gas turbine unit including a turbine, a compressor driven thereby, and a combustion system, with fuel injection and ignition members and perhaps with a fuel pump and other auxiliaries.

The fairings 9 and 10 are rearward parts of the outer skin members 11 and 12 of the wing. Each engine has its intake duct leading thereto through the wing as shown in Fig. 1 from part of a long shallow inlet opening extending preferably along substantially the whole wing span in the neighborhood of the leading edge of the wing 3; this is a diffusing inlet formed between the shaped leading-edge members 13 and 14 in Fig. 2. Each intake duct is in a hollow wall formed by the upper outer skin 11 and an inner stiffening plate 15 attached to the spar 4 and spaced from the outer skin by stiffeners 6. The latter divide the incoming air into separate inlet paths for individual engines or groups of engines. Walls 17 and 18 extend the inlet ducts up to central inlet openings 5a through the spar 5 into the engine intakes. Additionally or alternatively, unless they cannot be accommodated because of space required for retracted under-carriages, similar inlet ducts are provided by the lower skin 12 and walls 16, 19 and 20. The diffusing inlet need not be in the leading edge as shown in Fig. 1; Fig. 11 shows for example the inlet above the leading edge with only an upper inlet duct.

The spar 5 carries each engine by rails 21 secured thereto (Fig. 3) supporting cradles 31 fastened around the engines. Each engine abuts against the spar, with its inlet aligned with a hole 5a in the spar and carries disengageably a sealing flange 23 of flexible or rubbery material which will of course engage tightly under working conditions, due to the reduction of internal pressure by the engine inlet suction. The usual disengageable pipe couplings and electrical couplings are provided for connection to the engines. Each engine is retained by one or more pins 24 engaging the cradle 31 and rail 21 and accessible from the rear of the engine. If necessary, access may be had to the pins 24 and the couplings through normally covered hand holes in the skins 11 and 12.

Each engine 7 has its jet pipe decreasing in depth and increasing in width so as to change progressively from circular section, and terminate in the elongated shallow nozzle 8, usually symmetrical with respect to the engine; however, in engines adjacent to the wing tips, which engines may have to be displaced somewhat towards the fuselage to allow for reduction of wing thickness at the tip, the nozzles may be unsymmetrically disposed. Engines adjacent to the fuselage 1 may in some cases discharge through nozzles extending under the fuselage to give as nearly as possible an uninterrupted nozzle slot from wing-tip to wing-tip.

It will be seen that Fig. 1 provides a simple construction for discharging the jet as a long shallow sheet extending along the trailing edge of the wing, from a number of comparatively small engines, readily with-drawable and replaceable, and may provide also a construction wherein the engines form the trailing part of the wing and their intake ducts form an integral part of the structure of the wing.

The above-described construction for removably mounting the engines in the wings forms the subject of copending application Serial No. 421,539, filed April 7, 1954, now Patent Number 2,756,008, in name of I. M. Davidson.

For deflecting the sheet jet upwards and downwards the nozzle terminates in a jet deflector indicated in Fig. 1 as a hinged wing-flap 29 (such as those shown in more detail in Figs. 6–10).

Figure 5:
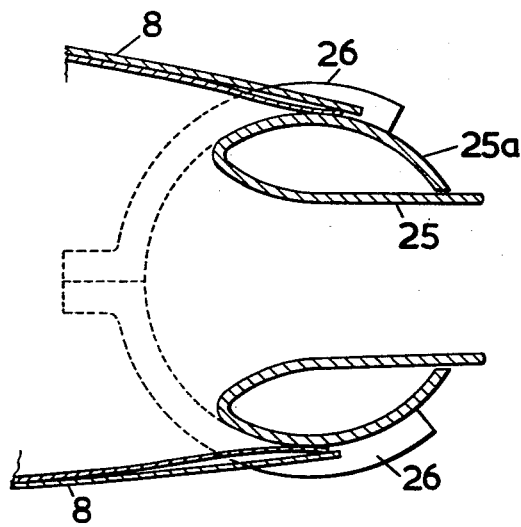
Figure 5 is a view of an alternative form of jet deflector.

In an alternative jet deflector shown in Fig. 5, the nozzle 8 of each engine is extended by, and the nozzle opening passes diametrically through, a cylinder 25 which forms the trailing edge and can turn about its axis in bearings 26 between the engines, the ends of the jet pipe or nozzle 8 partly embracing and making sealing engagement with the cylindrical surface; such a nozzle element may be made of sheet metal which forms a bell-mouthed convergent nozzle with the sheet at the inner enlarged end of the nozzle bent back upon itself at 25a and curved to a part cylindrical shape around the outside of the nozzle. The jet can be deflected upwardly and downwardly. Thus if a line extending horizontally rearwardly from the trailing edge of the wing, when the aircraft is in the attitude of normal horizontal flight, be regarded as the mid-position line of the jet, the deflecting means may be effective to deflect the jet to issue from the trailing edge upwardly at any angle to the mid-position line up to about 10° or probably in no case above 30°, and downwardly at any angle which usually need not exceed 70°; in some cases the maximum downward deflection need not be greater than 45°. The deflectors need not be in line but those on different engines may be set at different angles to give a stepwise change of angle of the jet along its length. The deflectors are secured together in two groups on opposite sides of the aircraft fore and aft centre line, each group being operable by an actuator indicated at 28 in Fig. 6. It will usually be unnecessary for each engine to have its own separately operable jet-deflecting means to give gradual differential deflection of the jet on opposite sides of the centre line, but the deflector will be long enough to deflect the desired part of the jet. Preferably, as will be described with reference to Fig. 4, there is provision for differential throttling of the engines on opposite sides of the centre line of the aircraft to simulate the effect of a rudder.

Figure 6:
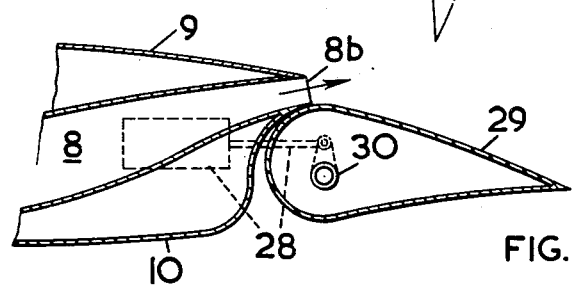

To increase the lift of an aircraft wing during landing it is common practice to provide the wing with a rear flap—i.e. to form at least part of the trailing edge of the wing as a separate piece hinged to the rest of the wing and movable downwards on occasion. In an important feature of the present invention the propulsive jet is discharged all along the rear of the wing over a hinged rear wing-flap. Thus, as shown in Fig. 6, which is an enlarged section through the rear end of the wing, a wing-flap 29 is mounted on hinge pin 30 on the rear of the wing in conventional manner and is conventionally actuated by actuator 28 but the flap is much shorter chordwise, in relation to the wing chord, than conventional wing-flaps hitherto used. The flap 29 extends as nearly as possible from each wing-tip to the fuselage. The flap has a short chord-wise extent of only about 2 percent to 5 percent of the total wing chord and probably need not in any case exceed about 10 percent. The engine nozzle pipe 8 ends in a nozzle 8b having its orifice extending along the rear end of the body of the wing so that under normal forward flight conditions a jet is emitted rearwardly, flowing over the top surface of the wing flap 29. When the flap is moved downward, as for take-off or landing, the jet deflects to follow the line of the top surface of the flap, and so leaves the wing in a downwardly inclined direction. The flap may be eccentrically hinged so that as it moves downwards it opens a narrow slot between it and the body of the wing; this allows a controlled amount of air to pass up from the region of higher pressure below the wing on to the top surface of the flap.

The nozzle 8b is shown directed for producing a jet inclined upwardly relatively to the direction for normal forward flight, but the gas is however induced to follow the line of the top of the flap 29 to hold the jet horizontal for example, in flight; accordingly upward movement of the flap will allow the jet to incline upwards. This may be preferable to using the upward movement of the flap to force the jet upward.

Figure 7:
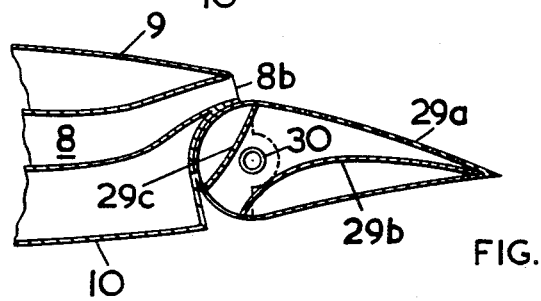

In the modification shown in Fig. 7 there is no variable or permanent gap for leakage of air between flap and body but the flap 29a has an internal passage bounded by walls 29b and 29c to admit air from below which effuses through apertures or pores in the upper wall of the flap. This air also internally cools the flap and effects effusion cooling of the top surface, which would otherwise be exposed to the hot gas jet.

Figure 8:
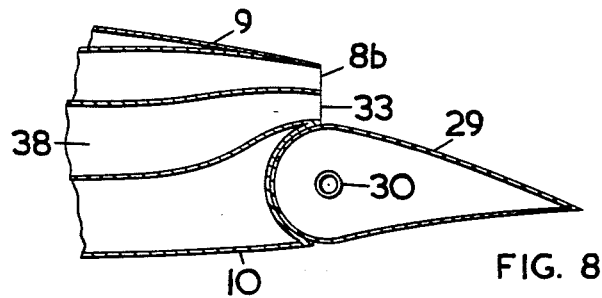

In the further modification shown in Fig. 8 the nozzle is in two tiers, the jet being provided in layers, partly by hot gas through the upper tier 8b and partly by cooler air through the lower tier 33, the air layer being adjacent to the top surface of the wing flap 29 which may not then have to be otherwise cooled. The air may be supplied by the compressor of one or more of the jet engines; thus the so-called by-pass engine, of which the arrangement is shown in Fig. 4, comprises a turbine 34, a compressor 35 driven thereby, a combustion chamber 36 receiving part of the air from the compressor and supplying hot gas to the turbine, a pipe 37 from the turbine outlet supplying hot gas for part of the propulsive jet and a pipe 38 supplying air by-passing the turbine for another part of the jet. Such an engine is used in the present arrangement, the turbine outlet pipe 37 being connected to the nozzle 8b and the by-pass pipe 38 to the nozzle 33. Fuel is supplied to the combustion chamber 36 through the throttle 39, there being a throttle 39 for engines on one side of the centre line and another for those on the other side so that they can be differentially operated in place of or to assist the aircraft rudder.

In Fig. 8 the jet issues adjacent to the junction of wing flap and body. In the modification shown in Fig. 9 the nozzle aperture 8c extends along the wing on its top surface, forward of the junction between the integral part of the wing and wing-flap 29, so that the issuing jet will under all conditions flow over the trailing-edge wing-flap 29 without separation therefrom. This may be ensured by causing air or gas, in a quantity small compared with the jet, to flow in a film of suitable thickness and velocity, along the top surface of the flap 29. A layer of cool air again helps to prevent overheating of the wing-flap. Each of the jet engines housed in the wing has a short jet pipe 8d curving upward from the turbine exhaust outlet to the nozzle aperture 8c, which is adjacent to the turbine exhaust outlets, and is in a step or small hump in the top of the wing. From the compressor of each engine there extends rearward through the wing, between the jet pipes 8d, an air pipe 40 by-passing the combustion system and turbine to supply, through a non-return valve 41 and common manifold 42, an auxiliary jet nozzle 43 between the main jet nozzle 8c and the wing-flap 29. The aperture of nozzle 43 extends along the wing-span at the rear end of the integral part of the wing, so as to discharge air directly over the wing-flap 29. In some or possibly all working positions of the hinged wing-flap 29 there may also be space between flap and wing as in Fig. 6 which allows air to pass from underneath and flow over the upper surface of the flap. If the main jet nozzle 8c be considerably forward of the trailing edge there may be a further and similar intermediate auxiliary nozzle extending over the wing span, in a second hump or step on the upper surface of the wing, and discharging some of the by-pass air in a layer over the rearmost jet of by-pass air.

Figure 10:
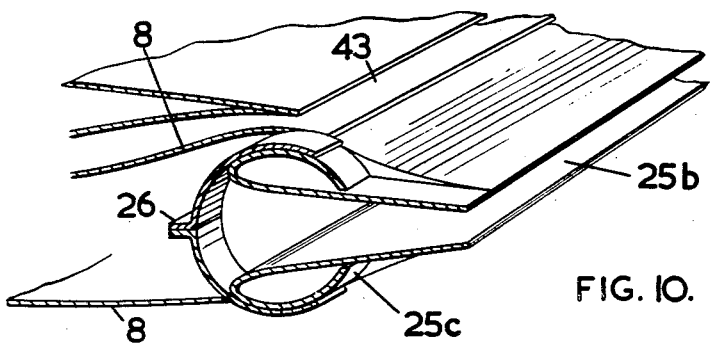
Figures 6, 7, 8, 9 and 10 are views of the trailing edge of a wing with alternative forms of hinged wing-flap.
Figure 9:
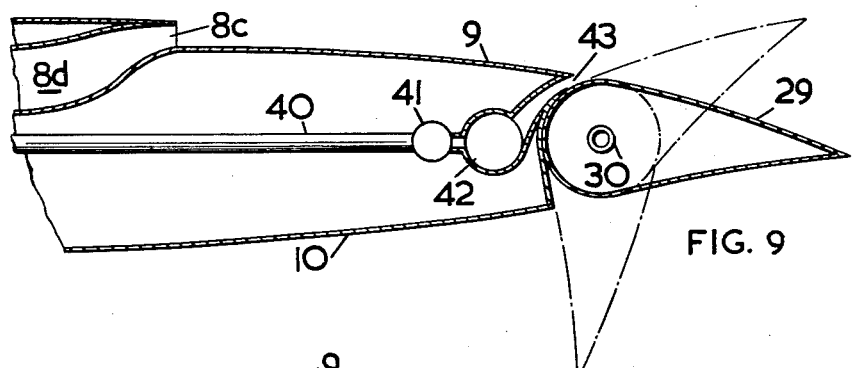

Fig. 10 shows a modification of the deflector of Fig. 5 which has the external form of a wing-flap 25b except where, between engines, it has more nearly cylindrical parts 25c supported in the bearings 26. Thus the jet passes through and issues from the trailing edge of a hinged trailing-edge wing-flap. A layer of cool air is directed over the top of the wing-flap by the nozzle 43, as described with reference to Figure 9.

In the jet deflectors of Figs. 5 and 10 the upper and lower walls bounding the jet move up and down together; if it were desired to vary the outlet nozzle area they would have to be independently movable walls.

Although the jet issuing as a sheet from the trailing edge of the wing is a propulsive jet and may provide the whole propulsive effort, the invention may be used with the addition of one or more jet engines in nacelles discharging through conventional jet nozzles to give some extra propulsive effort.

Referring to Fig. 12 which is a diagram corresponding to Fig. 2, let air be flowing around an aerofoil wing 3, and let a long sheet propulsive jet issue from the trailing edge of the wing, inclined downwards at an angle $\theta$ as it issues. If the jet sheet be long enough in its extent along the wing—extending over a major part of the wing span—it will react directly with the overall main stream air flow over the wing. The jet will be eventually redeflected rearward as shown, whatever may be the angle $\theta$, the distance of recovery increasing as the aircraft speed decreases; hence a thrust increment is induced on the wing so that the total propulsive thrust does not decrease in accordance with the forward component of the issuing velocity of the jet. At the same time the flow over the wing will be affected by the sheet so that the action of the jet is to alter the pressure distribution over the wing considerably and increase very considerably the aerodynamic lift on the wing, apart from and in addition to the upward component of the jet thrust. A concentrated jet, as from a conventional jet pipe, can, if downwardly deflected, force its way through the flow over the wing without being immediately appreciably affected by the flow and without having more than a limited local effect on the flow. A jet in the form of a sufficiently long sheet from the trailing edge of the wing on the other hand will behave effectively like a wing-flap (hence it may be called a "jet flap") and moreover like a flap of which the chord increases as the aircraft speed decreases. Variation of the pressure distribution and aerodynamic lift is obtained by altering the angle $\theta$ but without the loss of forward thrust conventionally associated with jet deflection; hence the jet serves both as propulsive and control jet. The addition of the wing flap does not alter the principle of operation of the jet flap but provides a very convenient method of deflecting the jet and affords wing-flap control on engine failure. Moreover the wing flap maintains the increase of lift at cruising speeds when the effectiveness of the jet flap alone would be seriously reduced by considerable reduction in the above-mentioned recovery distance. Since the wing-flap is however small, disadvantages of conventional wing-flaps of greater chord are overcome.

We claim:

1. An aircraft comprising a wing; a plurality of jet engines mounted in the wing; the wing including a hinged trailing edge wing flap and being formed with a long shallow rearwardly directed nozzle extending along a major part of the wing span, the nozzle comprising two superimposed tiers, said engines being connected to discharge propulsive jet streams through the upper tier, the upper tier of the nozzle being disposed to discharge the jet streams over the upper surface of said flap so that they leave the trailing edge of the flap as a long thin spanwise extending continuous sheet; and means for supplying cooling air to the lower tier of the nozzle, the lower tier of the nozzle being disposed to direct said air over said upper surface of the wing flap between the flap and said jet streams.

2. An aircraft comprising a wing formed with a first long shallow rearwardly directed nozzle extending along a major part of the wing span, the wing including a hinged trailing edge flap; a plurality of gas turbine engines mounted in the wing, each engine comprising a compressor, a combustion system and a turbine having its exhaust connected to discharge a propulsive jet stream through said nozzle, said nozzle being disposed to discharge the jet streams over the upper surface of said flap so that they leave the trailing edge of the flap as a long thin continuous spanwise extending sheet; the wing being further formed with a second long shallow rearwardly directed nozzle extending continuously along a major part of the wing span, and with a manifold connected to said nozzle, the compressors of said engines being connected and supply compressed air to said manifold through non-return valves and the nozzle being disposed to discharge said air over the whole spanwise extent of said upper surface of the wing flap between the flap and said jet streams.

3. An aircraft comprising a wing formed with two long shallow rearwardly directed nozzles extending along a major part of the wing span and including a hinged trailing edge wing flap; a plurality of jet engines mounted in the wing, said engines being connected to discharge propulsive jet streams through one of said nozzles; means to supply cooling air to the other of said nozzles; said first-mentioned nozzle being disposed to discharge the jet streams over the upper surface of said flap so that they leave the trailing edge of the flap as a long thin spanwise extending continuous sheet, and said other nozzle being disposed to direct said air over said upper surface of the flap between the flap and said jet streams.

4. An aircraft according to claim 3 wherein said other nozzle is located adjacent to the leading edge of the flap and said first-mentioned nozzle is located in the upper surface of the wing forwardly of the leading edge of the flap.

5. An aircraft comprising a wing formed with a first long shallow rearwardly directed nozzle extending along a major part of the wing span the wing including a hinged trailing edge wing flap; a plurality of by-pass gas turbine engines mounted in the wing, each comprising a compressor, a by-pass duct connected to receive part of the output of said compressor, a combustion system connected to receive a further part of the output of the compressor and a turbine having its exhaust connected to discharge a propulsive jet stream through said nozzle, said nozzle being disposed to discharge the jet streams over the upper surface of the flap so that they leave the trailing edge of the flap as a long thin continuous spanwise extending sheet, the wing being further formed with a second long shallow rearwardly directed nozzle extending continuously along a major part of the wing span, the by-pass ducts of the engines being connected to discharge air streams through said second nozzle, the second nozzle being disposed to discharge said air over the upper surface of the wing flap between the flap and said jet streams.

6. An aircraft comprising a pair of wings extending on opposite sides of the aircraft fore and aft centre line, each wing being formed with rearwardly directed nozzle means; jet propulsion means connected to discharge propulsive jet streams through said nozzle means and the nozzle means in each wing being shaped and directed to discharge the jet streams so that they leave the trailing edge of the wing as a long thin sheet extending continuously along a major part of the wing span; and means for deflecting said jet sheets upwardly and downwardly from the rearward direction either together or differentially at will.

7. An aircraft comprising a wing including a trailing edge wing flap extending along a major part of the wing span; a plurality of jet engines, each comprising a compressor, mounted within said wing, said wing being formed firstly with a plurality of rearwardly directed nozzles distributed along a major part of the wing span, said jet engines being connected to discharge propulsive jet streams through said nozzles and said nozzles being shaped and disposed to discharge the jet streams rearwardly over the upper surface of the flap so that they leave the trailing edge thereof as a long thin spanwise extending continuous sheet, secondly with an internal common manifold extending spanwise of the wing, said compressors being connected to supply air to said manifold through non-return valves, and thirdly with a further long shallow rearwardly directed nozzle extending continuously along a major part of the wing span, said further nozzle being connected to receive air from the manifold and being disposed to discharge said air as a continuous layer over the whole spanwise extent of the upper surface of the flap between said surface and the jet streams.

8. An aircraft comprising a wing including a trailing edge wing flap extending along the wing span, the chordwise extent of the flap being at most 10% of the wing chord; jet propulsion means arranged to discharge a propulsive jet stream rearwardly over the flap as a long thin jet sheet extending along the span of the flap; means mounting the flap for turning about an axis extending spanwise of the wing between a position in which the flap trailing edge points in a rearward direction and a position in which it points in a direction downwardly inclined from said rearward direction, the flap when in said last-mentioned position being disposed to guide the jet sheet along a path following its upper surface towards its trailing edge, and said jet propulsion means being such that the jet sheet is discharged from the flap trailing edge in the direction in which said trailing edge is pointing; and means operable to turn the flap between said two positions.

9. An aircraft comprising a pair of wings extending on opposite sides of the aircraft fore-and-aft center line and each including a trailing edge wing flap extending along its span, the chordwise extent of the flap being at most 10% of the wing chord; a plurality of jet engines arranged to discharge propulsive jet streams rearwardly over the flap as long thin jet sheets extending along the span of the flap; means mounting each flap for turning about an axis extending spanwise of the wing between a position in which the flap trailing points in a rearward direction and a position in which it points in a direction downwardly inclined from said rearward direction, each flap when in said last-mentioned position being disposed to guide the jet sheet along a path following its upper surface towards its trailing edge, and said jet engines being such the jet sheets are discharged from the flap trailing edges in the direction in which said trailing edges are pointing and afford sufficient propulsive effort to propel the aircraft; and means operable to turn each flap between said two positions.

10. An aircraft comprising a wing including a trailing edge wing flap extending along the wing span; jet propulsion means arranged to discharge a propulsive jet stream rearwardly over the flap as a long thin jet sheet extending along the span of the flap; means mounting the flap for turning about an axis extending spanwise of the wing between a position in which the flap trailing edge points in a direction upwardly inclined from the rearward direction and a position in which it points in a direction downwardly inclined from said rearward direction through a position in which it points in said rearward direction, the flap when in each of said positions being disposed to guide the jet sheet along a path following its upper surface towards its trailing edge, and said jet propulsion means being such that the jet sheet is discharged from the flap trailing edge in the direction in which said trailing edge is pointing; and means operable to turn the flap upwardly and downwardly between said positions.

11. An aircraft according to claim 10 wherein the chordwise extent of the flap is at most 10% of the wing chord.

12. An aircraft comprising a wing formed with rearwardly directed jet nozzle means, the wing including a trailing edge wing flap extending along the wing span, the chordwise extent of the flap being at most 10% of the wing chord; jet propulsion means connected to discharge a propulsive jet stream through said nozzle means, said nozzle means being shaped and disposed to discharge said jet stream rearwardly over the flap as a long thin jet sheet extending along the span of the flap; means mounting the flap for turning about an axis extending spanwise of the wing between a position in which the flap trailing edge points in a rearward direction and a position in which it points in a direction downwardly inclined from said rearward direction, the flap when in each of said positions being disposed to guide the jet sheet along a path following its upper surface towards its trailing edge, and said jet propulsion means being such that the jet sheet is discharged from the flap trailing edge in the direction in which said trailing edge is pointing; and means operable to turn the flap between said two positions.

13. An aircraft comprising a pair of wings extending on opposite sides of the aircraft fore-and-aft centre line, each formed with rearwardly directed jet nozzle means and including a trailing edge wing flap extending along the wing span, the chordwise extent of the flap being at most 10% of the wing chord; jet propulsion means connected to discharge propulsive jet streams through said nozzle means, the nozzle means in each wing being shaped and disposed to discharge the jet stream rearwardly over the flap as a long thin jet sheet extending along the span of the flap; means mounting each flap for turning about an axis extending spanwise of the wing between a position in which the flap trailing edge points in a direction upwardly inclined from the rearward direction and a position in which it points in a direction downwardly inclined from said rearward direction through a position in which it points in said rearward direction, the flap when in each of said positions being disposed to guide the jet sheet along a path following its upper surface towards its trailing edge, and said jet propulsion means being such that the jet sheets are discharged from the flap trailing edges in the direction in which said trailing edges are pointing and afford sufficient propulsive effort to propel the aircraft; and means operable to turn said flaps between said positions.

14. An aircraft according to claim 13 wherein said flap-turning means are operable to turn the flaps in opposite wings either together or differentially at will.

15. An aircraft comprising a wing including a trailing edge wing flap, and a plurality of jet engines, each comprising a compressor, said wing being formed firstly with a plurality of rearwardly directed jet nozzles, said jet engines being connected to discharge propulsive jet streams through said nozzles and said nozzles being shaped and disposed to discharge the jet streams rearwardly along a path following the upper surface of the flap so that they leave the trailing edge thereof as a long thin spanwise extending sheet, secondly with an internal common manifold extending spanwise of the wing, said compressors being connected to supply air to said manifold through non-return valves, and thirdly with further rearwardly directed nozzle means connected to receive air from said manifold and shaped and disposed to discharge said air rearwardly as a layer over the upper surface of the flap between said surface and said jet streams.

16. An aircraft comprising a wing including a trailing edge wing flap, jet propulsion means, and compressed air supply means, said wing being formed firstly with at least one rearwardly directed jet nozzle, said jet propulsion means being connected to discharge a propulsive jet stream through said nozzle and said nozzle being shaped and disposed to discharge the jet stream rearwardly along a path following the upper surface of the flap so that it leaves the trailing edge thereof as a long thin spanwise extending jet sheet, and secondly with at least one further rearwardly directed nozzle, said air supply means being connected to supply air to said further nozzle, and said further nozzle being shaped and disposed to discharge said air rearwardly as a layer over the upper surface of the flap between said surface and said jet streams.

References Cited in the file of this patent

UNITED STATES PATENTS

| | | |
|---|---|---|
| 2,270,920 | Backhaus | Jan. 27, 1942 |
| 2,420,323 | Meyer | May 13, 1947 |
| 2,585,676 | Poisson | Feb. 12, 1952 |

FOREIGN PATENTS

| | | |
|---|---|---|
| 325,002 | Great Britain | Feb. 10, 1930 |
| 971,992 | France | Aug. 23, 1950 |
| 55,382 | France | Jan. 9, 1952 |
| | (Addition to No. 971,992) | |